United States Patent
Lee et al.

(10) Patent No.: US 9,031,373 B2
(45) Date of Patent: May 12, 2015

(54) LIGHTWAVE CIRCUIT AND METHOD FOR MANUFACTURING SAME

(75) Inventors: Seo Young Lee, Subuk-Myeon (KR); Hyung Jong Lee, Subuk-Myeon (KR)

(73) Assignee: Seo Young Lee, Subuk-Myeon (KR)

( * ) Notice: Subject to any disclaimer, the term of this patent is extended or adjusted under 35 U.S.C. 154(b) by 0 days.

(21) Appl. No.: 14/007,085

(22) PCT Filed: Nov. 21, 2011

(86) PCT No.: PCT/KR2011/008886
§ 371 (c)(1),
(2), (4) Date: Sep. 24, 2013

(87) PCT Pub. No.: WO2012/134025
PCT Pub. Date: Oct. 4, 2012

(65) Prior Publication Data
US 2014/0023320 A1    Jan. 23, 2014

(30) Foreign Application Priority Data

Mar. 25, 2011  (KR) .......................... 10-2011-0026838

(51) Int. Cl.
| | |
|---|---|
| *G02B 6/10* | (2006.01) |
| *G02B 6/26* | (2006.01) |
| *G02B 6/125* | (2006.01) |
| *G02B 6/136* | (2006.01) |

(52) U.S. Cl.
CPC *G02B 6/26* (2013.01); *G02B 6/125* (2013.01); *G02B 6/136* (2013.01)

(58) Field of Classification Search
CPC ........... G02B 6/26; G02B 6/125; G02B 6/136
USPC .......................................................... 385/132
See application file for complete search history.

(56) References Cited

U.S. PATENT DOCUMENTS

| | | | | |
|---|---|---|---|---|
| 6,110,775 | A * | 8/2000 | Fujii et al. ...................... | 438/254 |
| 6,542,685 | B1 * | 4/2003 | Yoneda .......................... | 385/130 |
| 6,826,345 | B1 * | 11/2004 | Zhong et al. ................... | 385/129 |
| 7,113,683 | B2 * | 9/2006 | Hayamizu et al. .............. | 385/14 |
| 7,471,866 | B2 * | 12/2008 | Dumais et al. ................. | 385/129 |
| 2003/0081922 | A1 * | 5/2003 | Ide ................. | 385/129 |
| 2003/0235371 | A1 * | 12/2003 | Shimada et al. ................ | 385/50 |
| 2004/0234205 | A1 * | 11/2004 | Shimada et al. ................ | 385/50 |
| 2009/0297091 | A1 * | 12/2009 | Assefa et al. ................... | 385/14 |
| 2012/0087620 | A1 * | 4/2012 | Pardo et al. ..................... | 385/14 |

FOREIGN PATENT DOCUMENTS

| | | | |
|---|---|---|---|
| JP | 01191804 A * | 8/1989 | |
| JP | 2003121766 A | 4/2003 | |
| JP | 200920356 A | 1/2009 | |

(Continued)

*Primary Examiner* — Charlie Y Peng
(74) *Attorney, Agent, or Firm* — The Webb Law Firm

(57) ABSTRACT

Provided are a lightwave circuit and a method of manufacturing the same. The lightwave circuit includes a first substrate having an engraved core formation groove which is formed on an upper portion of the first substrate, a core layer which is formed inside the engraved core formation groove, a BPSG bonding layer which is formed on the first substrate including the core layer, and a second substrate which is formed on the BPSG bonding layer. Accordingly, light loss and branching uniformity of the lightwave circuit are effectively improved, and the lightwave circuit is manufactured simply and inexpensively while also further improving light loss and branching uniformity of the lightwave circuit.

14 Claims, 11 Drawing Sheets

(56) References Cited

FOREIGN PATENT DOCUMENTS

| KR | 20020048497 A | * | 6/2002 |
| KR | 20020089871 A | | 11/2002 |
| KR | 100367087 B1 | | 1/2003 |
| KR | 1020040008876 A | | 1/2004 |
| KR | 100650820 B1 | | 11/2006 |

* cited by examiner

_US 9,031,373 B2_

LIGHTWAVE CIRCUIT AND METHOD FOR MANUFACTURING SAME

TECHNICAL FIELD

The present invention relates to a lightwave circuit and a method of manufacturing the same, and more particularly, to a lightwave circuit and a method of manufacturing the same which can effectively improve light loss and branching uniformity by forming each of lightwave circuits to/from which an optical signal is input or output using an engraved lightwave circuit core, and in which manufacture can be performed simply and inexpensively while also further improving light loss and branching uniformity of the lightwave circuit.

BACKGROUND ART

Generally, an optical power splitter which is called a splitter or an optical divider which has a function of transmitting one lightwave to a plurality of subscribers (1×N) is a very important device in a broadband optical communication network (the optical power splitter of 2×N can also be used according to a configuration method of a communication network), and is used in data communication, a passive optical network (PON), fiber-to-the-home (FTTH), and so on.

Important features required in the optical power splitter are 1) excellent branching uniformity (with low variability with respect to an input optical wavelength, polarization, or temperature change), 2) low light loss, and 3) low-cost mass-producibility. However, among current technology of manufacturing the optical power splitter, planar lightwave circuit (PLC) technology has been known as the best technology of implementing the features, and the PLC technology is currently the main method used to manufacture optical power splitters.

The method is used to configure an optical circuit in which a core and a clad surrounding the core are formed by depositing multiple layers of silica or a thin polymer film while performing photolithography and etching on a silicon or quartz substrate and the optical signal is divided and mixed according to a shape of the core using a difference in a refractive index between the core and the clad.

There are various methods of configuring the optical power splitter since various structures in which one lightwave divides into a plurality of lightwaves have been proposed. The structures are largely classified as a star shape and a tree shape depending on a shape of dividing optical power, and methods of using a Y-branch lightwave circuit, a multi mode interferometer (MMI), a star coupler, a directional coupler, and so on have been offered.

However, in devices using a structure such as the MMI, the star coupler, the directional coupler, and so on, a split ratio of the optical power with respect to an incident optical wavelength or polarization change is varied. Accordingly, the structures are not used for commercial products in a market of a passive optical network (PON), etc., but are used for special products.

On the other hand, since a Y-branch optical power splitter has low wavelength dependence and enables miniaturization, the Y-branch optical power splitter is included in most commercial optical power splitters as a fundamental component. However, due to a structure in which a unit splitter of a Y-branch (1×2) is serially connected in a tree shape, a change amount of a split ratio depending on branching uniformity of output ports, manufacturing processes, temperature, wavelength, polarization, etc. increases in proportion to the connection number of trees. Accordingly, the split ratio of the unit splitter should be very exact and the change amount of the split ratio should be small.

When methods of manufacturing PLCs are classified according to a method of manufacturing a lightwave circuit core, there are 1) an embossed process method of forming an embossed core on a plane clad substrate and covering a lid clad thereon (this is currently the main method used to manufacture PLCs), and 2) an engraved process method of forming an engraved groove with a core shape, filling a core therein, planarizing the core by chemical mechanical polishing (CMP) or an etch-back process, and overlaying the lid clad.

Meanwhile, input and output cross sections of a manufactured PLC chip are polished as an inclined plane (an angle of about 8 degrees), and a polished optical fiber array block which is also polished as the inclined plane is bonded to the polished cross sections with epoxy. Here, the optical fiber array block is a block in which an optical fiber array is fixed between optical fiber fixed groove blocks including upper and lower parts. Each of the upper and lower parts has a thickness of about 1 millimeter, and the optical fiber array block has a total thickness of 2 millimeters.

Accordingly, the optical fiber array block and a PLC processed on a substrate with a thickness of about 1 millimeter have a difference in a bonding area. In order to remove distortion of epoxy bonding, a lid glass with a thickness of about 1 millimeter is added on the upper side of the substrate of the PLC. However, since the epoxy is largely different from the PLC in material characteristics, distortion or detachment may occur due to changes in temperature/humidity. Further, when bonding the substrate of the PLC and the lid glass, considerable and additional manufacturing efforts such as thickness control of the epoxy with respect to the entire surface of the substrate are required.

FIG. 1 is a diagram illustrating a structure of a Y-branch lightwave circuit according to an embodiment of a conventional art.

Referring to FIG. 1, the Y-branch lightwave circuit according to an embodiment of a conventional art includes an input lightwave circuit 10, and first and second output lightwave circuits 20 and 30.

Here, the input lightwave circuit 10 is configured to input an optical signal through an input side cross section, and have a shape that widens toward an output side cross section.

The first and second output lightwave circuits 20 and 30 are configured to extend symmetrically with respect to a center line from the output side cross section of the input lightwave circuit 10.

The conventional Y-branch lightwave circuit optimizes a width and a length of the input lightwave circuit 10, and a branch angle of the first and second output lightwave circuits 20 and 30, and light loss is minimized when an interval between the first and second output lightwave circuits 20 and 30 is zero. However, when the lightwave circuit is manufactured, the interval between the first and second output lightwave circuits 20 and 30 which can be implemented in a photo exposure process has a minimum of 1 to 2 microns. Accordingly, certain light loss may be incurred.

Meanwhile, in the conventional embossed process method, even if the interval between the first and second output lightwave circuits 20 and 30 is minimized at a branch point, since an etching depth in a narrow gap between the first and second output lightwave circuits 20 and 30 is smaller than that of other areas due to an RIE-lag phenomenon in an etching process of a lightwave circuit core, lower portions of cross sections of the two first and second output lightwave circuits 20 and 30 are connected, and bubbles in the narrow gap are generated in a lid clad process, or the core is inclined since the two first and second output lightwave circuits 20 and 30 pull each other due to melting and sintering of the lid clad.

Accordingly, in order to solve the problem, oxide additives such as boron oxide ($B_2O_3$), phosphorus pentoxide ($P_2O_5$) are heavily doped into the lid clad material, and then the core is melted and damaged by the lid clad in the lid clad process and the light loss is increased.

Further, the lid clad process is a process requiring a long time to deposit a very thick film with a thickness of about 20 to 40 microns. Accordingly, productivity is greatly reduced, Further, the lightwave circuit core receives a stress due to a large difference in thermal expansion coefficients between two materials configuring a bottom clad substrate of a quartz glass and a heavily doped thick lid clad, and thus degradation of branching uniformity, particularly, polarization dependent loss (PDL), is increased.

The lid clad process varies in a thickness of a deposited film compared with a conventional semiconductor process with a thickness less than or equal to 1 micron. Accordingly, no commercial apparatus is appropriate for this, much time and effort are needed to deposit the thick film as an optical film with high quality, and thus the lid clad process is the most difficult process in manufacturing PLCs.

DISCLOSURE

Technical Problem

The present invention is directed to providing a lightwave circuit that can improve light loss and branching uniformity of optical power in an aspect of operation and structure of an optical branch lightwave circuit by forming each of lightwave circuits for inputting, dividing, or outputting an optical signal using an engraved lightwave circuit core.

The present invention is further directed to providing a method of manufacturing a branch lightwave circuit by which not only can a structure of the branch lightwave circuit be easily manufactured, but damage or deformation of a lightwave circuit in a branch portion of the lightwave circuit can also be prevented, optical power loss can be minimized, and branching uniformity can be improved by manufacturing a lightwave circuit core by an engraved formation groove with an engraved shape in an aspect of manufacturing the branch lightwave circuit.

The present invention is still further directed to providing a method of manufacturing a PLC by which not only can an optical power split ratio be improved, but manufacture can also be further simplified and productivity can be increased by improving a process of bonding a lid clad and a lid glass of the conventional PLC.

The present invention is further directed to providing a method of manufacturing a PLC with high productivity and reliability, in which high quality photolithography can be performed with a non-contact mask which is applicable to a large-caliber substrate of 200 millimeters or more instead of a contact mask having substrate contamination and a high defect rate.

Technical Solution

One aspect of the present invention provides a lightwave circuit including: a first substrate having an engraved core formation groove which is formed on an upper portion of the first substrate; a core layer which is formed inside the engraved core formation groove; a boro-phospho-silicate glass (BPSG) bonding layer which is formed on the first substrate including the core layer; and a second substrate which is formed on the BPSG bonding layer.

The BPSG bonding layer may be a layer which is formed using Ge-doped BPSG (Ge-BPSG) or F-doped BPSG (F-BPSG) in which germanium (Ge) or fluorine (F) is doped as a material.

The core layer is preferably formed using Ge-BPSG in which Ge is doped as a material. However, the core layer may be formed using F-BPSG in which F is doped as a material, or a composition of Ge and F may be sequentially changed in the core layer.

The BPSG bonding layer may have a different refractive index from the core layer, and may be formed to have the same composition as the first substrate.

The BPSG bonding layer may be inserted into a groove of the core layer to a predetermined depth in order to improve reproducibility and reliability of a process.

Another aspect of the present invention provides a method of manufacturing a lightwave circuit, including: forming an etch mask layer on a first substrate on which a prescribed process is completed; forming an etch mask pattern by engraving a lightwave circuit pattern on the etch mask layer; forming a lightwave circuit groove in at least one engraved shape by etching the first substrate using the etch mask pattern as an etch barrier; forming a lightwave circuit core on the etched lightwave circuit groove; planarizing the surface of the first substrate; forming a predetermined bonding layer on at least one of the first substrate and a second substrate which is prepared; and bonding the first and second substrates.

Still another aspect of the present invention provides a method of manufacturing a lightwave circuit, including: forming a first etch mask layer on a first substrate on which a prescribed process is completed; forming a lightwave circuit groove in at least one engraved shape by selectively etching the first substrate using the first etch mask layer; forming a lightwave circuit core in the etched lightwave circuit groove; planarizing the surface of the first substrate using the first etch mask layer as a stop layer; etching the first etch mask layer; and forming a bonding layer on an upper surface of the first substrate including the lightwave circuit groove.

The method may further include performing a planarization process to remove a step difference between the surface of the first substrate and the upper surface of the core.

Advantageous Effects

According to a lightwave circuit and a method of manufacturing the same of the present invention, an effect in which light loss and an optical power split ratio of a branch lightwave circuit are improved by forming each of lightwave circuits for inputting or outputting an optical signal using an engraved lightwave circuit core can be achieved.

Also, according to the present invention, an advantage in which a process of manufacturing of a branch lightwave circuit for filling a lightwave circuit core into an engraved lightwave circuit groove prevents damage at a branch portion of the lightwave circuit, and thus optical power loss is minimized can be achieved.

Further, according to the present invention, when a core layer having a stress which can bend a substrate is first stacked using an engraving process instead of a conventional embossing process of performing a contact mask photolithography process on a bent substrate, a non-contact photo process can be performed with high quality using a stepper as an engraved shape on the surface of a planar substrate, an engraved groove can be formed, and a core can be filled into the engraved groove. Accordingly, a lightwave circuit can be manufactured by being photoprinted with high quality.

According to the present invention, since a high-quality non-contact photo process can be used, a large caliber wafer of 8 or 12 inches can be used, thus increasing productivity.

According to the present invention, since lightwave circuit grooves with engraved shapes are divided by sidewalls at a branch portion compared with a conventional Y-branch, even when a conformal deposition process is performed on only a thickness of half of a width of an input/output lightwave circuit, a lightwave circuit core can be filled. Additionally, after performing the conformal deposition, a core surface of the lightwave circuit can be formed without a convex in a light propagation direction compared with the conventional Y-branch.

Meanwhile, when a Y-branch is manufactured in an embossed core process, in a photo process of a core, it is difficult to reduce an interval between photoresists defining inner sides of first and second output lightwave circuits on an output side cross section of an input lightwave circuit to less than or equal to about 1.5 μm. Also, in a cleaning process of an etching interface necessary after etching the core, since both sides of the core are melted about 0.5 μm, the interval between the inner sides of the first and second output lightwave circuits becomes greater than or equal to 2.0 μm. Accordingly, since the interval between the inner sides of the first and second output lightwave circuits is expanded due to the cleaning process of the etching interface, light loss of the lightwave circuit is increased. However, when the Y-branch is manufactured in an engraved core process, in the cleaning process of the etching interface, since the core groove is melted toward both sides by about 0.5 μm, the interval between the inner sides of the first and second output lightwave circuits narrows about 0.5 μm compared with the embossed core process, and thus light loss can be decreased.

According to the present invention, before stacking the lightwave circuit core in an engraved lightwave circuit groove, a size of the deposited core can be adjusted by stacking a portion of clad as a conformal deposition.

According to the present invention, by stacking lightwave circuit materials which have different compositions from each other in an engraved lightwave circuit groove to form multiple layers of a core, an advantage in which a refractive index structure of the lightwave circuit can be varied in directions perpendicular to the lightwave circuit and parallel to the substrate can be achieved.

According to the present invention, the lightwave circuit can be simply manufactured without depositing a thick lid clad by performing fusion bonding or direct bonding on first and second substrates in a certain atmosphere.

Accordingly in the present invention, since a clad can be manufactured using a pure silica substrate which does not have vertical or horizontal stress on a core except a bonding layer, stress on the core can be removed, and branching uniformity of optical power with respect to polarization, wavelength, and temperature change can be improved.

MODES OF THE INVENTION

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Figure 1:
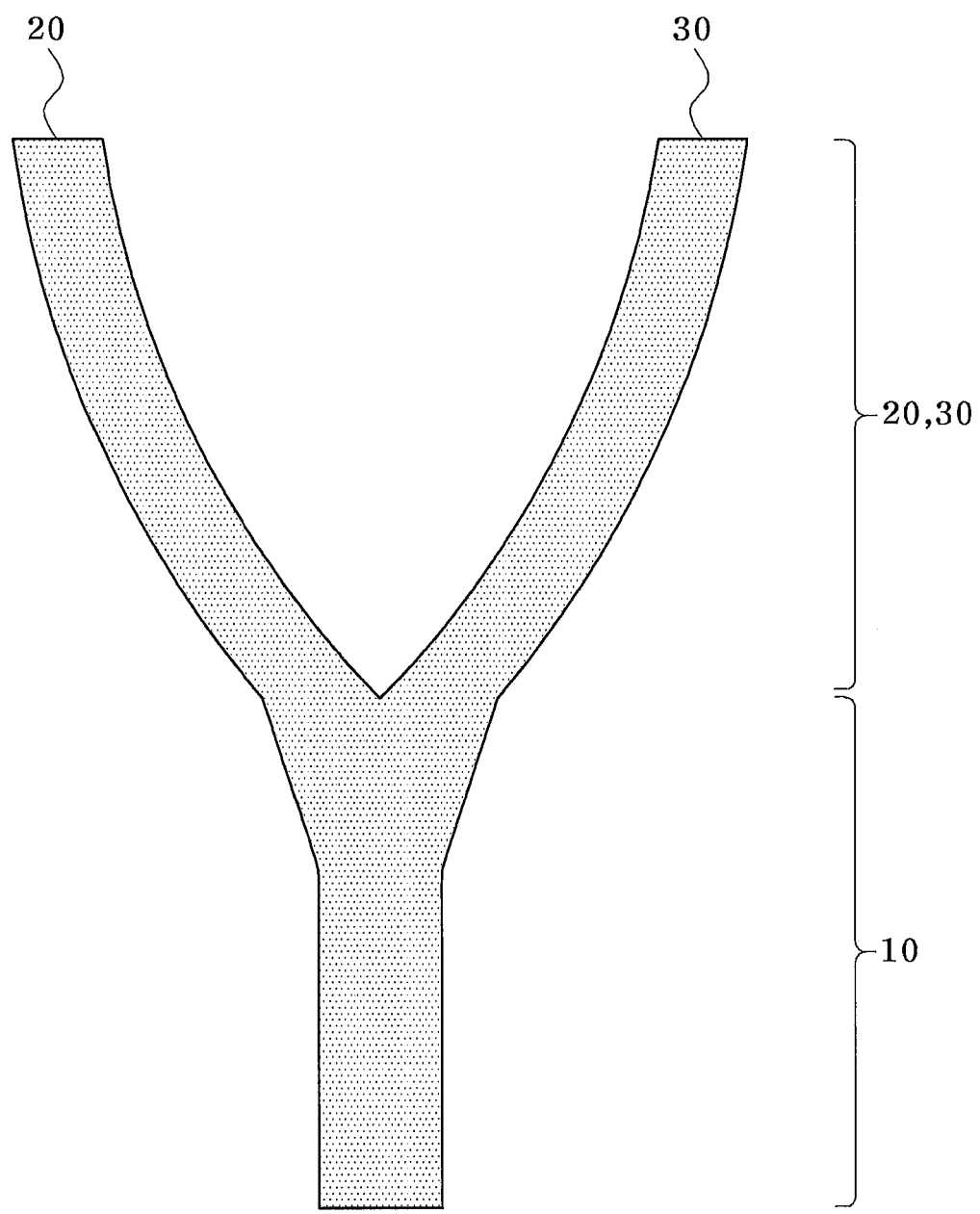
FIG. 1 is a diagram illustrating a structure of a Y-branch lightwave circuit according to a conventional art.
Figure 2:
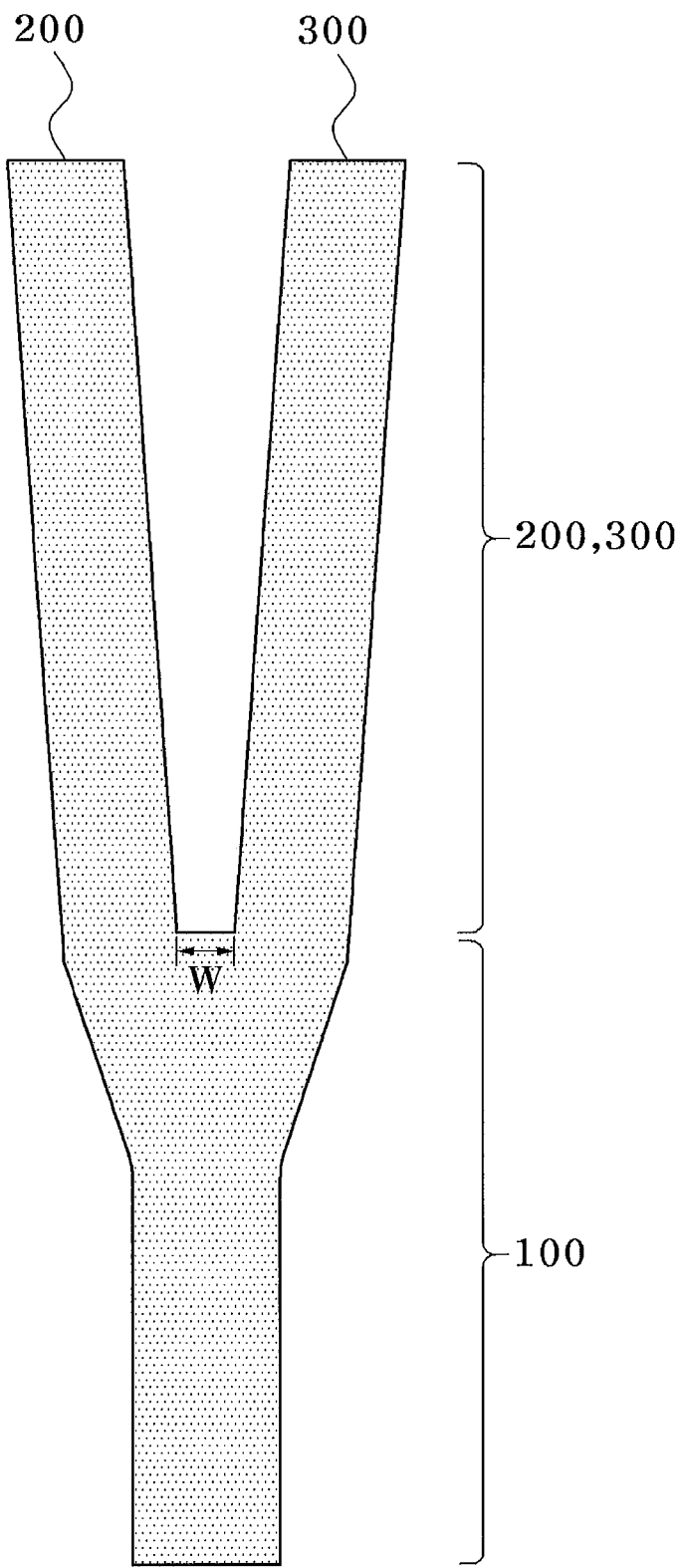
FIG. 2 is a diagram illustrating a structure of a branch lightwave circuit according to an embodiment of the present invention.

FIG. 2 is a diagram illustrating a structure of a branch lightwave circuit according to an embodiment of the present invention.

Referring to FIG. 2, the branch lightwave circuit includes an input lightwave circuit 100, and first and second output lightwave circuits 200 and 300.

Here, the input lightwave circuit 100 is configured to input an optical signal through an input side cross section, and have a shape becoming wider toward an output side cross section.

The first and second output lightwave circuits 200 and 300 are configured to extend symmetrically with respect to a center line from the output side cross section of the input lightwave circuit 10. Inner sides of the first and second output lightwave circuits 200 and 300 are formed to be spaced a predetermined interval W (preferably, about 0.2 µm to 2.0 µm) apart from each other in the cross section of the output side of the input lightwave circuit 100.

The interval W between input side end portions of the first and second output lightwave circuits 200 and 300, that is, the interval W between adjacent sides opposite to each other of the first and second output lightwave circuits 200 and 300, is preferably within a range of about 0.2 µm to 2.0 µm.

The optical branch lightwave circuit of the present invention is formed to be branched to both sides with a constant width as a Y shape from the input side end portions of the first and second output lightwave circuits 200 and 300 to the output side cross section.

Hereinafter, a method of manufacturing a branch lightwave circuit according to an embodiment of the present invention will be explained. A structure of the branch lightwave circuit may be manufactured using a method of manufacturing an engraved lightwave circuit core in order to maximize an effect thereof.

FIGS. 3 to 7 are cross-sectional views and perspective views for describing a method of manufacturing a branch lightwave circuit according to an embodiment of the present invention.

Figure 3:
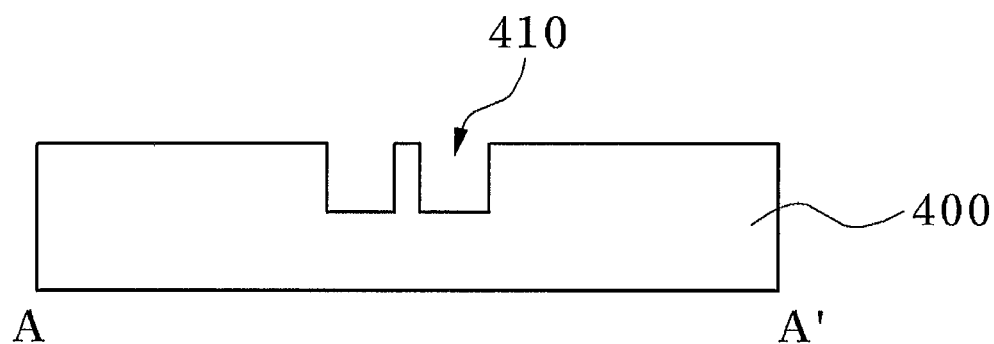
FIGS. 3 to 7 are cross-sectional views and perspective views for describing a method of manufacturing a branch lightwave circuit according to an embodiment of the present invention.

Referring to FIG. 3, the method of manufacturing the branch lightwave circuit includes forming an engraved etch mask pattern by performing a photolithography process using an etch mask layer, that is, a photomask (reticle: not shown) with a branch lightwave circuit shape as described above with reference to FIG. 2 using a non-contact or contact exposure apparatus on a structure or a first substrate 400 on which a prescribed process is completed, etching the first substrate 400 using the etch mask pattern, removing the etch mask pattern again, and forming a lightwave circuit groove 410 with an engraved shape for forming the lightwave circuit core by cleaning a contaminated etch interface (contamination due to C-F-based polymer material deposition or etch mask sputtering while etching).

Here, the first substrate 400 on which the prescribed process is completed may be a substrate used as a clad of the lightwave circuit, and a surface thereof may be modified such that the clad of the lightwave circuit is able to be used according to necessity. For example, the first substrate may be a silica substrate, a silicon oxide substrate, a substrate forming a clad, or a substrate modifying the surface of the substrate to a clad by a constant depth.

The etch mask layer (not shown) may be a mask layer for etching a lightwave circuit as an engraved shape on the first substrate 400, and the etch mask pattern is formed by transferring a photoresist pattern on the etch mask layer by any one of dry etching and wet etching or a combination thereof using a photolithography process.

Figure 4:
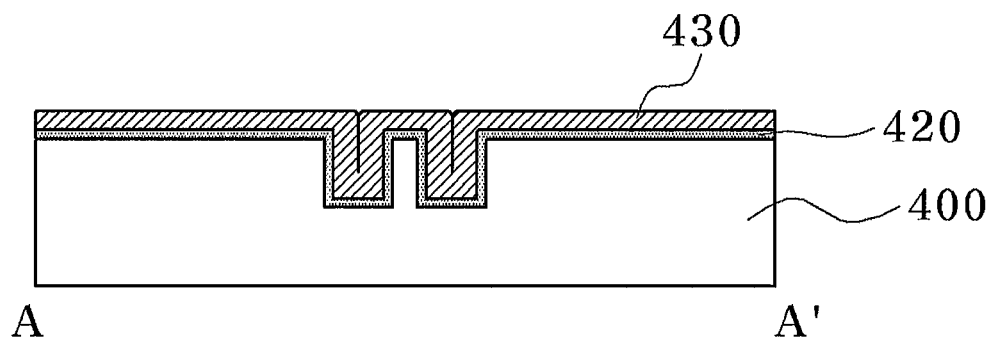

Referring to FIG. 4, a portion of a clad 420 is deposited on the lightwave circuit groove 410 with the engraved shape of FIG. 3A, for example, using a conformal deposition chemical vapor deposition (CVD) process, after which the lightwave circuit groove 410 is filled with a lightwave circuit core 430. Meanwhile, if a process similar to the clad conformal deposition is repeated, a plurality of lightwave circuit cores with different refractive indexes can be deposited on the lightwave circuit groove 410 with the engraved shape. Accordingly, lightwave circuit mode characteristics in a lightwave circuit cross section (two-dimensional) can be adjusted by changing the refractive index or stress distribution.

However, in order to reduce light loss of the branch lightwave circuit, when an interval between inner sides of the first and second output lightwave circuits 200 and 300 in an output side cross section of the input lightwave circuit 100 is reduced, the clad 420 needs not be deposited inside the lightwave circuit groove 410, that is, the core groove as described above, and it is desirable to minimize the interval between the inner sides of the first and second output lightwave circuits 200 and 300 by performing a conformal wet or dry etching process on the inside of the lightwave circuit groove 410 up to a thickness of about 0.2 µm to 0.5 µm.

A process of forming the lightwave circuit core 430 may be a process of filling the lightwave circuit core or the lightwave circuit clad and core into the etched lightwave circuit groove 410 with an engraved shape. For example, it is desirable to use a CVD or flame hydrolysis deposition (FHD) process, etc. A refractive index difference between the core and the clad can be adjusted by the amount and composition of additives. For example, germanium dioxide ($GeO_2$) or phosphorus pentoxide ($P_2O_5$) may increase the refractive index, and boron oxide ($B_2O_3$) or fluorine (F) may decrease the refractive index.

Meanwhile, when filling the lightwave circuit core or the clad into the lightwave circuit groove 410 using the CVD process, it is desirable to form a CVD film as single or multiple layers by a conformal deposition (conformal deposition is a process of depositing a deposition surface at an equal speed regardless of verticality or horizontality of the deposition surface), and a structure of the lightwave circuit can be changed by forming in a direction vertical to the lightwave circuit and parallel to the substrate. For example, the stacking of the multiple layers in the conformal deposition CVD method includes depositing a portion of the clad film on the lightwave circuit groove 410 with the engraved shape, and filling the lightwave circuit core film.

Figure 5:
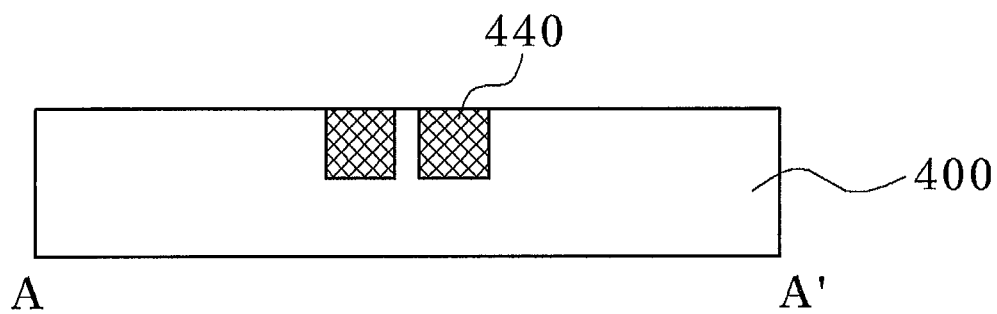

Referring to FIG. 5, a core material of an area other than a core material 440 filled into the lightwave circuit groove 410 (for example, the lightwave circuit core or lightwave circuit clad or core, etc.) is completely removed, and a process of planarizing the surface of the substrate is performed. This is called a first substrate planarization process. It is desirable to perform the first substrate planarization process using various methods such as CMP, reflow, PR coating, etch-back processes, and so on.

The reflow process is a process of planarizing the substrate of the deposition glass film through surface tension of the glass surface by softening or melting, by doping boron oxide ($B_2O_3$), phosphorus pentoxide ($P_2O_5$), fluorine (F), etc. in a silica film, and heating to a melting point of the deposition glass film lower than that of a silica substrate.

Figure 6:
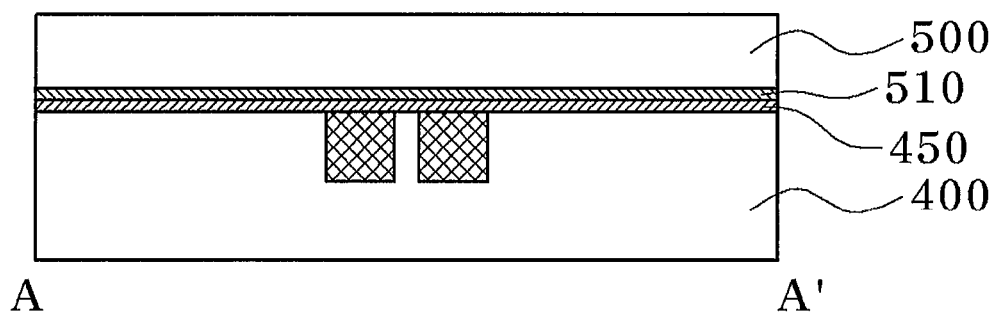

Referring to FIG. 6, certain bonding layers 450 and 510 are formed on at least one of the surfaces of the first substrate 400 and a previously prepared second substrate 500 (for example, a lid glass), and the bonding layers 450 and 510 are heated, melted, and bonded in a vacuum atmosphere.

At this time, for example, it is desirable to use an FHD method using a boro-phospho-silicate glass (BPSG) or a fluorinated silica glass as a main material as the process of forming the certain bonding layers 450 and 510 on the first and second substrates 400 and 500. However, the bonding layers 450 and 510 can be formed using a method such as CVD, spin-on-glass (SOG), etc., or by modifying the surface of the substrate by diffusing or ion-implanting boron (B), phosphorus (P), or fluorine (F), etc.

Preferably, a glass particle deposition process by an FHD process is performed on the bonding layers 450 and 510. At this time, the glass particle layer is consolidated more than about twenty times, and after being consolidated, the bonding layers 450 and 510 preferably have a thickness less than or equal to about 1 micron.

Meanwhile, the glass particle layer by the FHD process is easily breakable. Accordingly, after depositing the glass particles, it is advantageous to heat and cure the surface of the glass particle layer in a subsequent substrate contact and bonding process with only a flame without inserting a deposition base material.

When bonding the bonding layers 450 and 510, bubbles easily occur due to gas locked between the first substrate 400 and the second substrate 500. Accordingly, when melting the bonding layers 450 and 510, it is advantageous to use a vacuum electric furnace for a bonding atmosphere in a helium atmosphere at normal pressure.

Meanwhile, when bonding, it is desirable to apply pressure to the substrate using a plurality of pressurizing pendulums or apparatuses with a ring shape so that the first and second substrates 400 and 500 are bonded in a direction from a center of the substrate to an edge of the substrate, and the ring shape is preferably a concentric ring shape for adjusting the pressure according to the radius.

Further, when bonding the first and second substrates 400 and 500, in order to prevent bubbles from occurring, a groove (not shown) for exhausting bubbles is formed by cutting the surface using a dicing saw or dry etching through the entire surfaces of the first and second substrates 400 and 500.

For example, a groove of a checkerboard pattern is formed by cutting only the surface of the substrate using a dicing saw and spreading FHD particles. At this time, gas exhausted from each lattice unit may be exhausted through the sides of the substrate along the groove. When bonding the substrates, a gas atmosphere is preferably a vacuum, and it is desirable to use a gas such as helium with a high diffusion speed when the process is performed using the method of forming the groove as described above.

Meanwhile, there is no limit to thicknesses of the bonding layers 450 and 510, but it is desirable to minimize the thicknesses in order to reduce stress applied to a core. Particularly, the second substrate 500 preferably has functions of both the lid glass and lid clad, and the thicknesses of the bonding layers 450 and 510 are in a range of 0.5 to 5.0 µm (preferably, less than or equal to about 1 µm) in order to form a high-quality optical medium.

Figure 7:
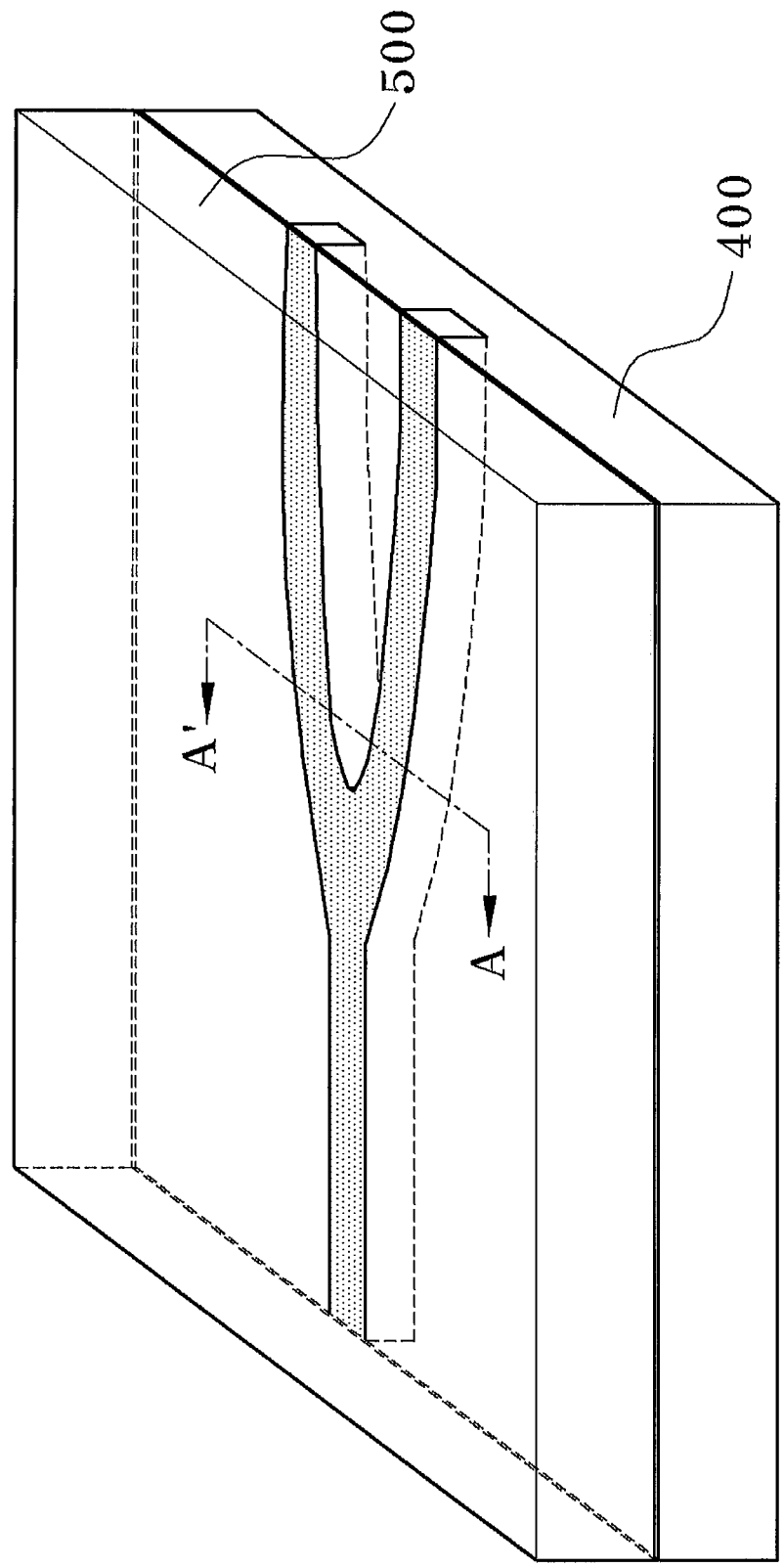

FIG. 7 illustrates a perspective view of an optical power splitter which is made by fusion bonding of the first and second substrates 400 and 500.

Figure 8:
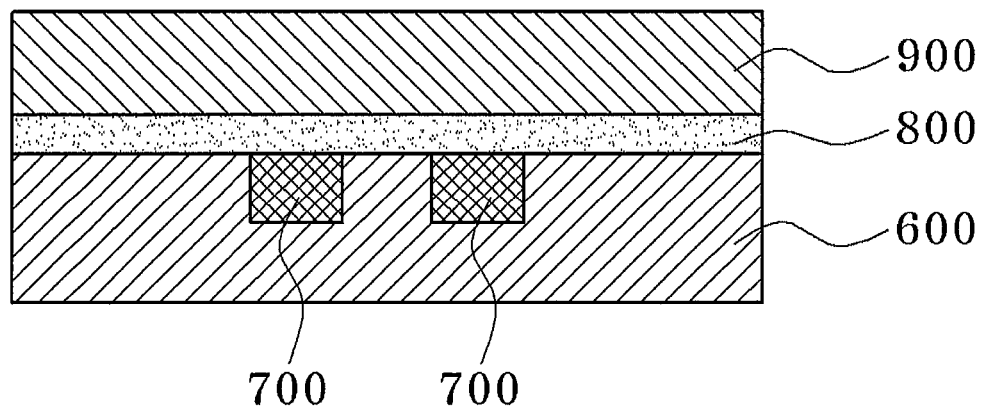
FIG. 8 is a diagram illustrating a cross-sectional structure of a lightwave circuit according to another embodiment of the present invention.

FIG. 8 is a diagram illustrating a cross-sectional structure of a lightwave circuit device according to another embodiment of the present invention.

Referring to FIG. 8, the lightwave circuit device according to another embodiment of the present invention includes a first substrate 600, a core layer 700, a Ge-BPSG bonding layer 800, a second substrate 900, and so on.

Here, as the first and second substrates 100 and 400 on which a predetermined process is completed, an engraved core formation groove 110 is formed on an upper portion of the first substrate 100 through a predetermined etching process, and the second substrate 400 is formed on a BPSG bonding layer 300, preferably, a Ge-boro-phospho-silicate glass (Ge-BPSG) bonding layer.

The core layer 700 is formed inside an engraved core formation groove 610 which is formed on the first substrate 600. For example, the core layer 700 is preferably formed of Ge-BPSG in which germanium (Ge) is doped through a CVD or FHD process, etc.

The Ge-BPSG bonding layer 800 is formed on the first substrate 600 including the core layer 700. For example, the Ge-BPSG bonding layer 800 is preferably formed of Ge-BPSG in which Ge is doped through a CVD or FHD process, etc.

Further, a refractive index of the Ge-BPSG bonding layer 800 is different from that of the core layer 700, the Ge-BPSG bonding layer 800 preferably has the same composition as the first substrate 600 and the same refractive index as the first substrate 600, and a thickness of the Ge-BPSG bonding layer 800 is preferably about 1 µm to 10 µm.

FIGS. 9 to 13 are cross-sectional views and perspective views for describing a method of manufacturing a lightwave circuit device according to another embodiment of the present invention.

Figure 9:
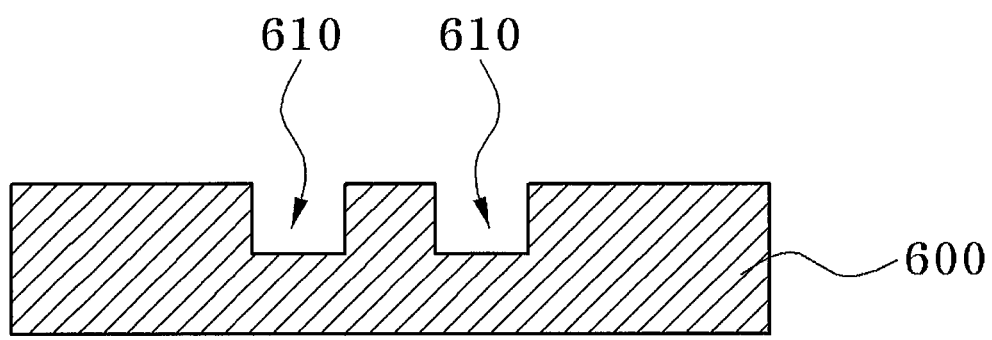
FIGS. 9 to 13 are cross-sectional views and perspective views for describing a method of manufacturing a lightwave circuit according to another embodiment of the present invention.

Referring to FIG. 9, an etch mask pattern is formed in an engraved shape by performing a photolithography process using an etch mask layer, that is, a photo mask (reticle; not shown) having a desired lightwave circuit shape (for example, a branch type or a straight linear type, etc.) using a photo exposure apparatus, etc. on a structure or the first substrate 600 on which a predetermined process is completed, after which the first substrate 600 is etched using the etch mask pattern, and then a core formation groove 610 with an engraved shape for forming the lightwave circuit core is formed by removing the etch mask pattern.

The etch mask layer (not shown) is a mask layer for etching the lightwave circuit core in an engraved shape on the first substrate 600, and the etch mask pattern is formed by transferring a photo resist pattern to the etch mask layer by either of dry and wet etching or a combination thereof using the photolithography process.

Figure 10:
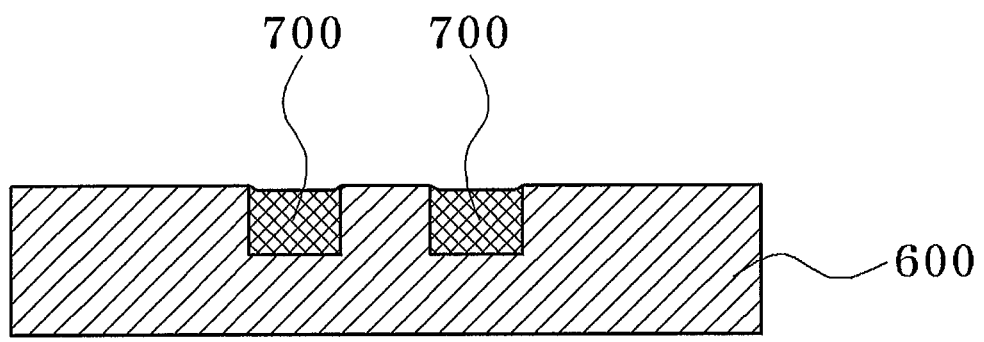

Referring to FIG. 10, the core layer 700 which is the lightwave circuit core is formed on the engraved core formation groove 610 of FIG. 9, the core layer 700 formed of Ge-BPSG in which Ge is doped.

A process of forming the core layer 700 includes filling a lightwave circuit core or a lightwave circuit clad and core into the engraved core formation groove 610. For example, it is desirable to use a CVD or FHD process, etc. Accordingly, a refractive index difference between the core and the clad can be adjusted according to the amount of an oxide such as germanium dioxide ($GeO_2$) or phosphorus pentoxide ($P_2O_5$) added.

Meanwhile, when filling the lightwave circuit core or clad into the engraved core formation groove 610 using a CVD process, it is desirable to form a CVD film as single or multiple layers by a conformal deposition (conformal deposition is a process of depositing at an equal speed regardless of verticality or horizontality of the deposition surface), and a structure of the lightwave circuit can be changed by forming in a direction vertical to a processing axis of light of the lightwave circuit. For example, the stacking of the multiple layers in the conformal deposition CVD method includes depositing a portion of the clad film on the engraved core formation groove 610, and filling a plurality of lightwave circuit core films which have different refractive indexes.

If the processes similar to the clad conformal deposition and the core deposition are repeated, a plurality of lightwave circuit core films with different refractive indexes can be deposited on the engraved core formation groove 610. Accordingly, lightwave circuit mode characteristics can be adjusted in a lightwave circuit cross section (two-dimensional) by changing the refractive index or stress distribution.

Optionally, after forming the core layer 700 on the engraved core formation groove 610, a process of planarizing the entire surface of the first substrate 600 may be further performed. This is called a substrate planarization process. For example, it is desirable to perform the substrate planarization process using various methods such as CMP, reflow, PR coating, and etch-back processes, etc.

The reflow process is a process of planarizing the substrate of the deposited glass film through surface tension of the glass surface by softening or melting, by doping boron oxide ($B_2O_3$), phosphorus pentoxide ($P_2O_5$), fluorine (F), etc. in a silica film and heating to a melting point of a deposition glass film lower than that of a silica substrate.

The substrate planarization process method of removing a core material of an area other than a substrate groove, that is, the engraved core formation groove 610 on the first substrate 600, is explained as an example. However, regardless of which of the above described methods is used, a core material on the first substrate 600 can be removed, but a slight substrate convex between the first substrate surface from which the core material is removed and a core upper surface of the engraved core formation groove 610 remains. Accordingly, it is difficult to make a planar surface with a thickness less than or equal to about 5 nm which is required for the substrate bonding. Therefore, a process of stacking a bonding layer on the planarized first substrate surface and removing the remaining convex is needed.

Hereinafter, a method of removing the convex using a CMP process will be explained. Bonding layer deposition and a convex removing process using the CMP process will be mainly explained, but the same applies to a process performed using a method such as reflow, PR coating, or an etch-back process. However, since planarization to a thickness less than or equal to several nm is needed for the substrate bonding, when a method such as the reflow, the PR coating, or the etch-back process is used, it is ultimately desirable to process the surface through the CMP process.

The planarized substrate surface from which a core of the first substrate is removed using the CMP process has a step difference of about tens to hundreds of nm since polishing rates of a core layer 900 and the first substrate 600 differ. That is, the core surface is lower than the first substrate surface. The step difference interrupts the bonding of the first and second substrates 600 and 900, and thus the periphery of the core is not bonded. Accordingly, in order to remove this problem, it is desirable to form a Ge-BPSG bonding layer (800 of FIG. 11) with the same composition as the first substrate 600 and the same refractive index as the first substrate 600 (the Ge-BPSG bonding layer has a different refractive index from the core layer).

Figure 11:
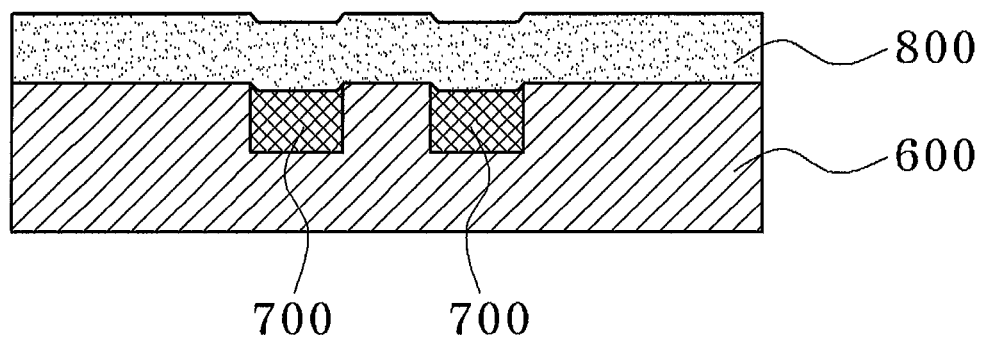

Referring to FIG. 11, the Ge-BPSG bonding layer 800 is formed on the entire surface of the first substrate 600 including the core layer 700 which is filled into the engraved core formation groove 610. For example, the Ge-BPSG bonding layer 800 is preferably formed to have a thickness of 1 µm to 10 µm using Ge-BPSG in which germanium (Ge) is doped as a material and a CVD or FHD process, etc. as a method.

Figure 12:
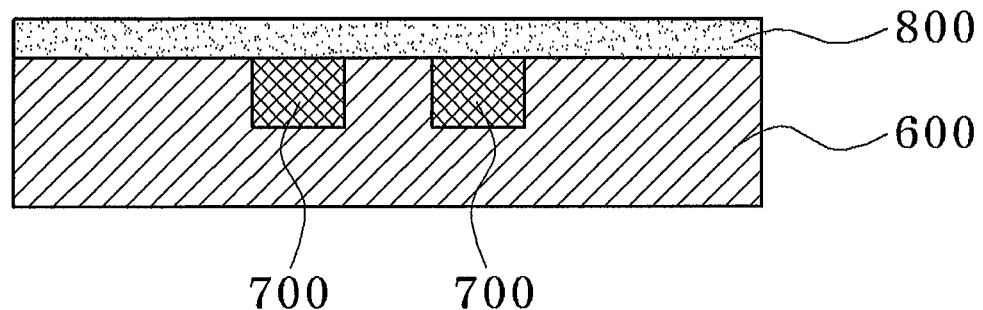

Referring to FIG. 12, even after forming the Ge-BPSG bonding layer 800 shown in FIG. 11, a step difference of the core surface and the first substrate surface remains. Accordingly, a process of planarizing the surface of the Ge-BPSG bonding layer 800 to have a thickness less than or equal to about 10 nm is performed.

Figure 13:
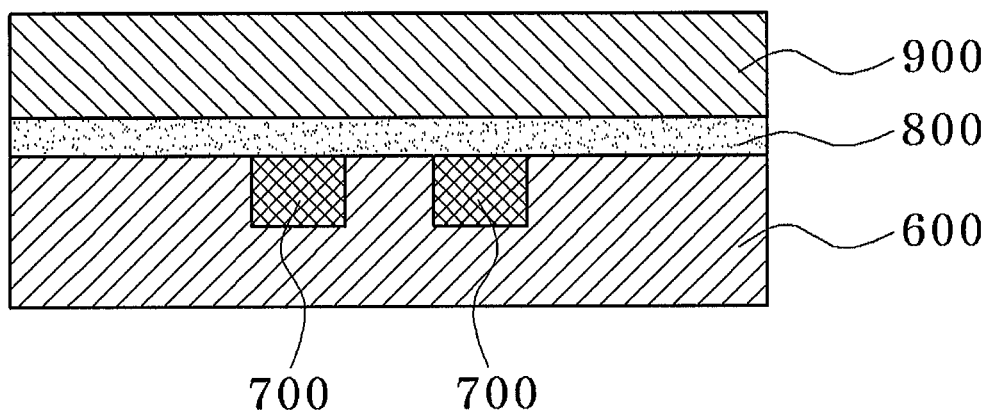

Referring to FIG. 13, after a previously prepared second substrate 900 is aligned and landed on the entire surface of the planarized Ge-BPSG bonding layer 800 of FIG. 12, the first and second substrates 600 and 900 are bonded through a predetermined heat treatment process. At this time, a temperature of the heat treatment process is about 400° C. to 600° C.

Further, pressure may be applied while bonding, and at this time, the pressure may be desirable to have a range of about 0.1 MPa to 0.8 MPa.

Additionally, after bonding the first and second substrates 600 and 900, in order to increase a bonding strength between the first and second substrates 600 and 900, the heat treatment process above a softening temperature, that is, about 700° C. or so (preferably, about 500° C. to 1000° C.) may be further performed for 2 hours to 4 hours (preferably, about 3 hours).

At this time, dopants of the Ge-BPSG bonding layer 800 lower the softening temperature of the Ge-BPSG bonding layer 800 to less than or equal to about 1000° C. to increase the bonding strength. Meanwhile, when using a pure silica bonding layer without a dopant, since the softening temperature is very high at about 1400° C., a high heat treatment is required. In this case, the core melts to the inside of the first and second substrates 600 and 900. Therefore, a lightwave circuit cannot be formed.

On the other hand, when bonding the first and second substrates 600 and 900, in order to prevent bubbles from occurring, a groove (not shown) for exhausting bubbles may be formed by cutting the surface using a dicing saw or dry-etching through the entire surface of a bonding portion of the first substrate 600 and/or the second substrate 900.

Figure 14:
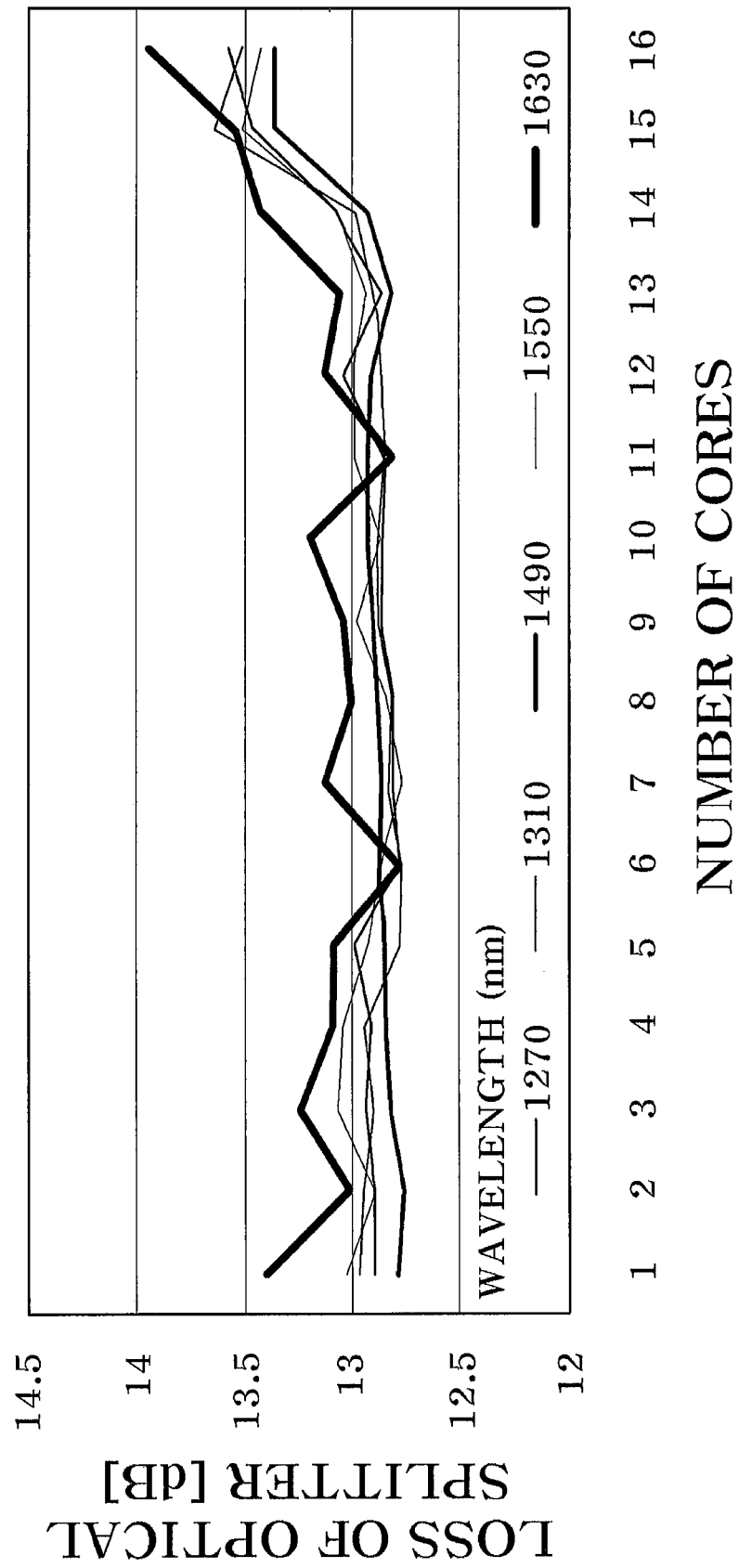
FIG. 14 is a graph illustrating optical split loss with respect to a wavelength of each core channel in a 1×16 optical splitter device manufactured according to an embodiment of the present invention.

FIG. 14 is a graph illustrating optical split loss with respect to a wavelength of each core channel in a 1×16 optical splitter device manufactured according to an embodiment of the present invention. At this time, since the 1×16 optical splitter has to divide an input light into 16 branching output lights, the input light performs 1×2 optical branching four times in a sequence of 2, 4, 8, and 16. Since an optical distribution is performed by 3 dB in each 1×2 optical branching, the amount of light is decreased by 12 dB in each of channels 1 to 16. The measurement result of FIG. 6 shows a branching loss of an average of about 13 dB.

However, considering that bonding loss between the input and output lightwave circuits and an optical fiber of the optical splitter is 0.2 dB (each 0.1 dB×input and output 2), general branching loss of 16 channels is 0.4 dB (16 channels include 4 1×2 serial channels; 0.1 dB per channel×4=0.4 dB), and light loss of 1.5 cm which is a total length of the 1×16 optical splitter is 0.1 to 0.2 dB, it is an excellent result. That is, there is almost no light loss of a bonding interface due to the substrate bonding of the present invention.

Figure 15:
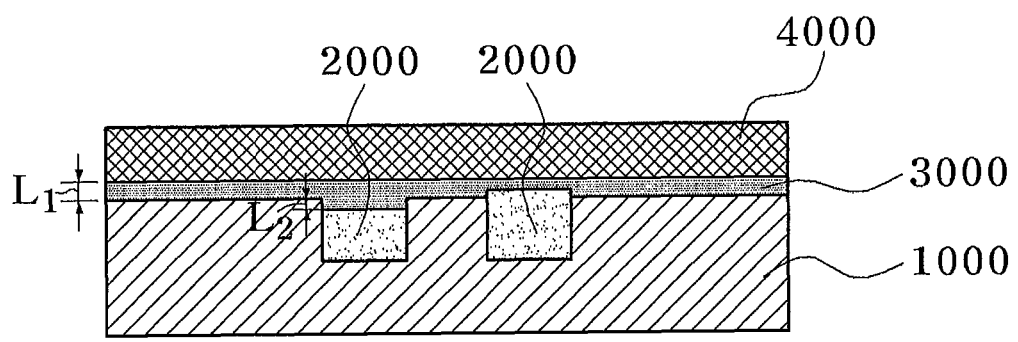
FIG. 15 is a cross-sectional view for describing a lightwave circuit device according to still another embodiment of the present invention.

FIG. 15 is a cross-sectional view for describing a lightwave circuit device according to still another embodiment of the present invention. The description of the present invention below will focus on the differences from the aforementioned embodiments.

Referring to FIG. 15, the lightwave circuit device according to still another embodiment of the present invention includes a first substrate 1000, a core layer 2000, a BPSG bonding layer 3000, and a second substrate 4000, etc.

One important feature according to still another embodiment of the present invention has a structure in which the BPSG bonding layer 3000 is inserted into a groove of the core layer 2000. This feature was conceived in order to secure reliability and reproducibility in a manufacturing process according to an embodiment of the present invention, and it is very important to control a depth of L2. Preferably, L2 is adjusted to have a depth less than or equal to 1000 nm, and more preferably, L2 is adjusted to have a depth of about 0 nm to 200 nm. A smaller depth of L2 is obviously advantageous. However, it has an advantage in that a process margin is secured by maintaining L2 less than or equal to a predetermined depth. That is, one important feature of an embodiment of the present invention is that the depth of L2 is adjusted to be less than or equal to 200 nm on all portions of the substrate, and the depth of L2 is adjusted to be constant through each process.

Inventors of the present invention have found that a feature difference of each finally manufactured lightwave circuit device reaches a negligible level if a depth of L2 is adjusted to be less than or equal to 1000 nm. This is because there is no significant difference due to a depth difference of L2 when a light is transmitted in the case in which a refractive index of a bonding layer is maintained to be equal to that of the substrate. The lightwave circuit device manufactured according to an embodiment of the present invention has an advantage in that a depth of L2 is diversely distributed in a range of 0 to 1000 nm, and a process margin is secured. Accordingly, reproducibility and reliability of a manufacturing process can be significantly improved, and yield of the manufactured lightwave circuit is increased. Meanwhile, according to the manufacturing method of the present invention, a depth of L2 is constantly adjusted to be less than or equal to 200 nm, more preferably, 100 nm. Accordingly, the manufacturing process has high reproducibility and reliability.

FIGS. 16 to 21 are cross-sectional views for describing a method of manufacturing a lightwave circuit device according to still another embodiment of the present invention.

Figure 16:
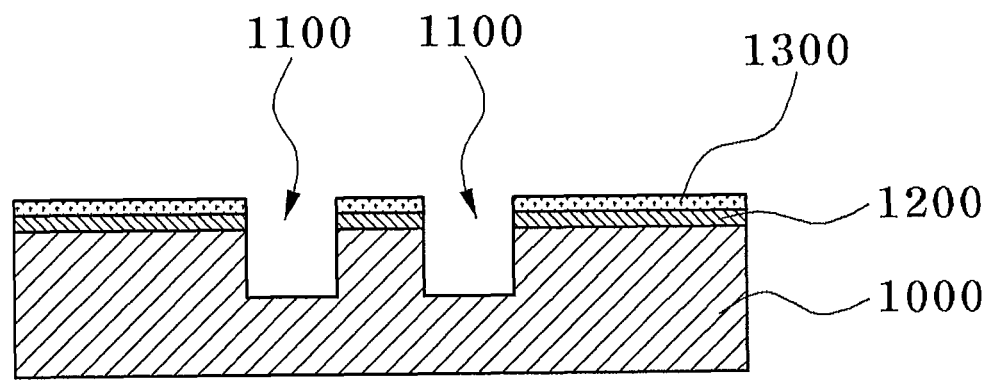
FIGS. 16 to 21 are cross-sectional views for describing a method of manufacturing a lightwave circuit device according to still another embodiment of the present invention.

Referring to FIG. 16, after depositing a first etch mask layer 1200 and a second etch mask layer 1300 on a structure or a first substrate 1000 on which a prescribed process is completed, a mask pattern is formed in an engraved shape using a photolithography method, and an engraved core formation groove 1100 for forming a lightwave circuit core is formed by etching the first substrate 1000 using the mask pattern (not shown).

Preferably, the second etch mask layer 1300 mainly uses a metal mask such as Cr, Ni, Cu, W, etc. or a PR in order to increase selectivity of the mask with respect to the etching of the engraved core formation groove 1100.

The first etch mask layer 1200 is used as a polishing selective layer with respect to a CMP process which will be described below rather than the mask for etching the core groove, and a silicon nitride ($SiN_x$) film is mainly used in order to increase polishing selectivity with respect to the CMP process.

Figure 17:
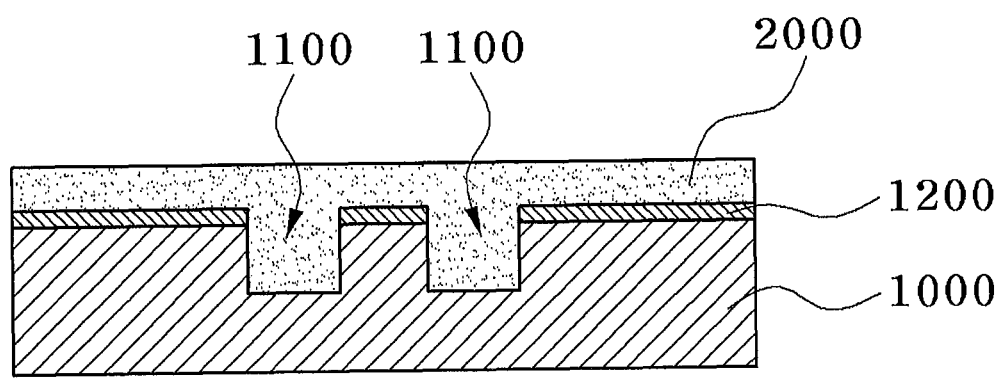

Referring to FIG. 17, firstly, the second etch mask layer 1300 of FIG. 16 is removed, and the lightwave circuit core is filled into the engraved core formation groove 1100 using Ge-BPSG or F-BPSG in which Ge or F is doped as a material to form the core layer 2000 on the first substrate 1000.

After inserting the core layer 2000 into the engraved core formation groove 1100, a process of planarizing the entire surface of the first substrate 1000 is further performed, preferably using a CMP process.

Figure 18:
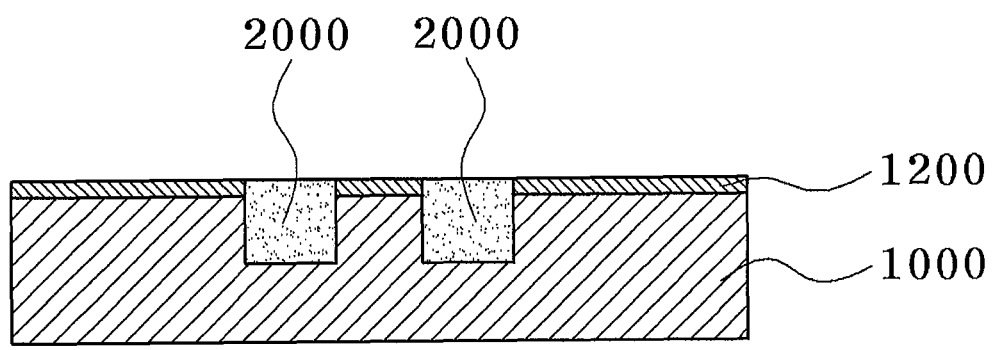

Next, referring to FIG. 18, the core layer 2000 outside the core groove is removed, and the first etch mask layer 1200 is polished.

However, due to a very low polishing ratio of the first etch mask layer 1200 (compared with that of silica), a polishing speed of the substrate is rapidly lowered to about several hundredths. Accordingly, a stop time of a polishing process is easily found. That is, this serves as a stop layer of the CMP process in a CMP planarization process.

In order to increase polishing selectivity which is a function of the stop layer of the CMP process of the first etch mask layer 1200, it is desirable to use a silicon nitride ($SiN_x$) film as the first etch mask layer 1200, and at this time, to add additives to a ceria ($CeO_2$)-based abrasive additive as an abrasive additive.

Figure 19:
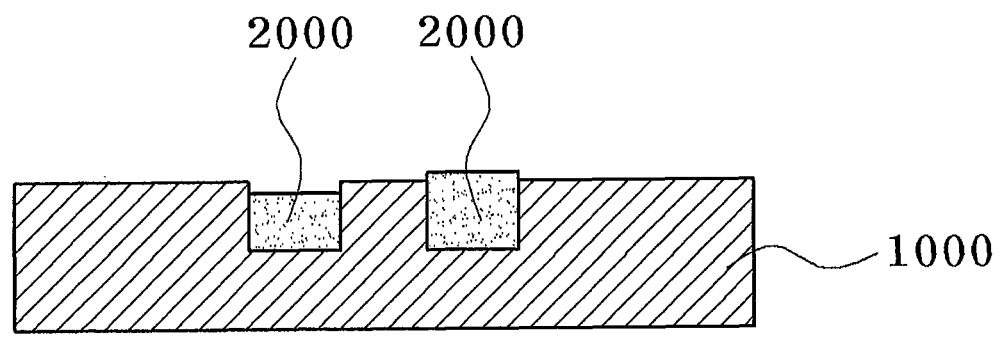

Next, referring to FIG. 19, the first etch mask layer 1200 which remains on the first substrate 1000 is removed. In this process, the upper surface of the core layer 2000 is embossed or engraved with respect to the substrate surface. FIG. 8D illustrates the upper surface of the core layer 2000 which is embossed and engraved as an example. The upper surface of the core layer 2000 may be engraved or may be embossed when the core layer is etched less according to a high polishing selectivity of the first etch mask layer 1200 compared with a silica core (Ge-BPSG or F-BPSG) described above.

That is, due to a polishing rate difference between the inside of the first etch mask area (an outer area of a core pattern covered with the first etch mask) and the outside of the first etch mask area (an inner area of the core pattern in which the first etch mask is opened), for example, a polishing rate difference between a silicon nitride ($SiN_x$) film and a Ge-BPSG or F-BPSG core, the upper surface of the core layer 2000 may have a convex (depression?). The convex makes direct bonding of the first and second substrates difficult. Accordingly, a second substrate planarization process is further needed.

Figure 20:
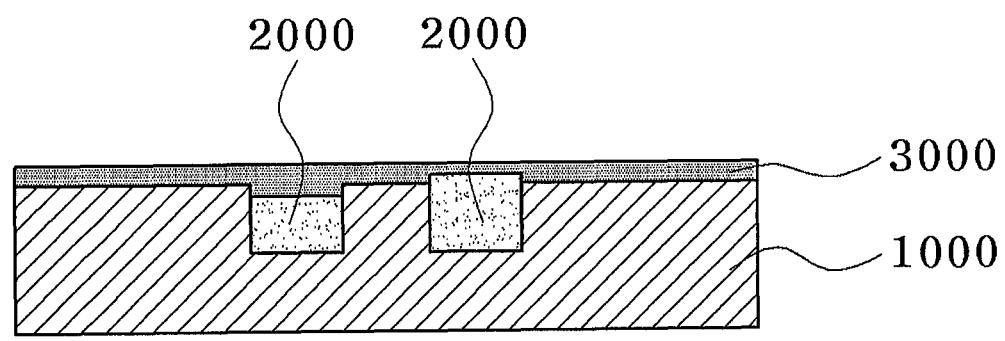

Referring to FIG. 20, a bonding layer 3000 of Ge-BPSG or F-BPSG is formed on the entire surface of the first substrate 1000 including the core layer 2000 filled into the engraved core formation groove 1100 in a thickness range of about 1 μm to 10 μm using the Ge-BPSG or F-BPSG in which Ge or F is doped as a material, and a CVD or FHD process as a method. After this, the second substrate planarization process is performed.

The second substrate planarization process is a planarization process for direct bonding. Even though the second substrate planarization process is not absolutely necessary, bonding is not easy without this process. Performing the planarization process so that the convex of the surface of the bonding layer 800 has a thickness less than or equal to about 10 nm is advantageous for the bonding.

According to an embodiment of the present invention in which the engraved core is formed, one important feature is to adjust a depth of L2 through the first etch mask layer 1200 and two planarization processes. This process is selected to secure reproducibility or reliability in a process of forming an engraved core and directly bonding the first and second substrates as described above.

Figure 21:
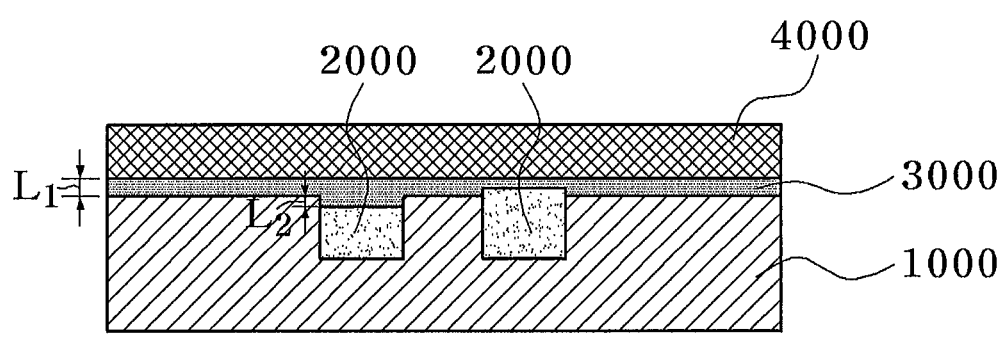

Referring to FIG. 21, after aligning and mounting a second substrate 4000 which is previously prepared on the entire surface of the planarized Ge-BPSG bonding layer 3000, the first and second substrates 1000 and 4000 are bonded through a predetermined heat treatment process.

In this specification, exemplary embodiments of the present invention have been classified as the first, second, and third exemplary embodiments and described for conciseness. However, respective steps or functions of an exemplary embodiment may be combined with those of another exemplary embodiment to implement still another exemplary embodiment of the present invention.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A lightwave circuit comprising:
   a first substrate having an engraved core formation groove which is formed on an upper portion of the first substrate;
   a core layer which is formed inside the engraved core formation groove;
   a boro-phospho-silicate glass (BPSG) bonding layer which is formed on the first substrate including the core layer; and
   a second substrate which is formed on the BPSG bonding layer, wherein the BPSG bonding layer has a different refractive index from the core layer and is formed to have a composition having substantially the same refractive index as the first substrate.

2. The lightwave circuit of claim 1, wherein the BPSG bonding layer is a layer which is formed using Ge-doped BPSG (Ge-BPSG) or F-doped BPSG (F-BPSG) in which germanium (Ge) or fluorine (F) is doped as a material.

3. The lightwave circuit of claim 1, wherein the core layer is a layer which is formed using Ge BPSG or F-BPSG in which Ge or F is doped as a material.

4. The lightwave circuit of claim 1, wherein the BPSG bonding layer is inserted into a groove of the core layer to a predetermined depth.

5. The lightwave circuit of claim 4, wherein the predetermined depth is less than or equal to 1000 nm.

6. The lightwave circuit of claim 1, wherein the lightwave circuit is a branch lightwave circuit, and
   an interval between inner sides of the first and second output lightwave circuits in an output side cross section is in a range of 0.2 µm to 2.0 µm.

7. A method of manufacturing a lightwave circuit, comprising:
   forming an etch mask layer on a first substrate on which a prescribed process is completed;
   forming an etch mask pattern by engraving a lightwave circuit pattern on the etch mask layer;
   forming a lightwave circuit groove in at least one engraved shape by etching the first substrate using the etch mask pattern as an etch barrier;
   forming a lightwave circuit core on the etched lightwave circuit groove;
   planarizing the surface of the first substrate;
   forming a predetermined bonding layer on at least one of the first substrate and a second substrate which is previously prepared; and
   bonding the first and second substrates, wherein the bonding layer has a different refractive index from the lightwave circuit core and is formed to have a composition having substantially the same refractive index as the first substrate.

8. The method of claim 7, wherein the first substrate is etched by either of dry etching or wet etching or a combination thereof.

9. The method of claim 7, wherein the bonding layer is formed by a flame hydrolysis deposition (FHD) method using Ge-BPSG or F-BPSG, or after depositing a glass particle layer by the FHD method, the surface of the glass particle layer is heated and cured using only a flame without injecting a deposition base material.

10. The method of claim 7, wherein the bonding layer is formed to have a thickness in a range of 0.5 to 5.0 µm.

11. A method of manufacturing a lightwave circuit, comprising:
    forming a first etch mask layer on a first substrate on which a prescribed process is completed;
    forming a lightwave circuit groove in at least one engraved shape by selectively etching the first substrate using the first etch mask layer;
    forming a lightwave circuit core in the etched lightwave circuit groove;
    planarizing the surface of the first substrate using the first etch mask layer as a stop layer;
    etching the first etch mask layer; and
    forming a bonding layer on an upper surface of the first substrate including the lightwave circuit groove, wherein the bonding layer has a different refractive index from the lightwave circuit core and is formed to have a composition having substantially the same refractive index as the first substrate.

12. The method of claim 11, further comprising performing a planarization process to remove a step difference between the surface of the first substrate and the upper surface of the lightwave circuit core.

13. The method of claim 11, further comprising bonding a second substrate and the first substrate.

14. The method of claim 11, wherein the bonding layer is inserted into a groove of the lightwave circuit core to a predetermined depth.

* * * * *